United States Patent [19]

Bonnet

[11] Patent Number: 4,621,897
[45] Date of Patent: Nov. 11, 1986

[54] OPTICAL APPARATUS AND A METHOD OF RECORDING OR INSTANTANEOUSLY VISULIZING ENLARGED AND STEREOSCOPIC IMAGES OF OBJECTS

[75] Inventor: Maurice Bonnet, Puteaux, France

[73] Assignee: Centre National de la Recherche Scientifique (CNRA), France

[21] Appl. No.: 458,878

[22] Filed: Jan. 18, 1983

[30] Foreign Application Priority Data

Jan. 22, 1982 [FR] France ................................ 82 00965

[51] Int. Cl.$^4$ ...................... G02B 27/22; G03B 35/00; G03C 9/08
[52] U.S. Cl. .................................... 350/130; 350/167; 354/112; 354/115
[58] Field of Search ....................... 350/167, 131, 130; 354/112, 115

[56] References Cited

U.S. PATENT DOCUMENTS 3,535,993 10/1970 Jones ................................... 354/112
3,737,229 6/1973 Jones ..................................... 355/78
4,078,854 3/1978 Yano ................................ 350/130 X

FOREIGN PATENT DOCUMENTS 653168 11/1937 Fed. Rep. of Germany .
750156 3/1933 France .

Primary Examiner—John K. Corbin
Assistant Examiner—Scott J. Sugarman
Attorney, Agent, or Firm—Thomas J. Greer, Jr.

[57] ABSTRACT

This invention relates to an optical apparatus for and a method of recording or instantaneously visualizing enlarged stereoscopic images of objects.

The apparatus comprises a stationary stopped down lens (1, 4) providing an enlarged image of an object (2), a first lenticular grating (3), the elementary lenses of which are positioned in the vicinity of said enlarged image, the angle of field of the lenticular grating (3) is substantially equal to the aperture angle (4') of the exit pupil of the lens viewed from the lenticular grating (3), in order to provide an instantaneous, composite, sampled image at the level of the focal plane of the first lenticular grating.

According to one embodiment for instantaneous observation, the apparatus also comprises a relief reversing system (9), an observation system (10) and a beam expanding system (11).

26 Claims, 7 Drawing Figures

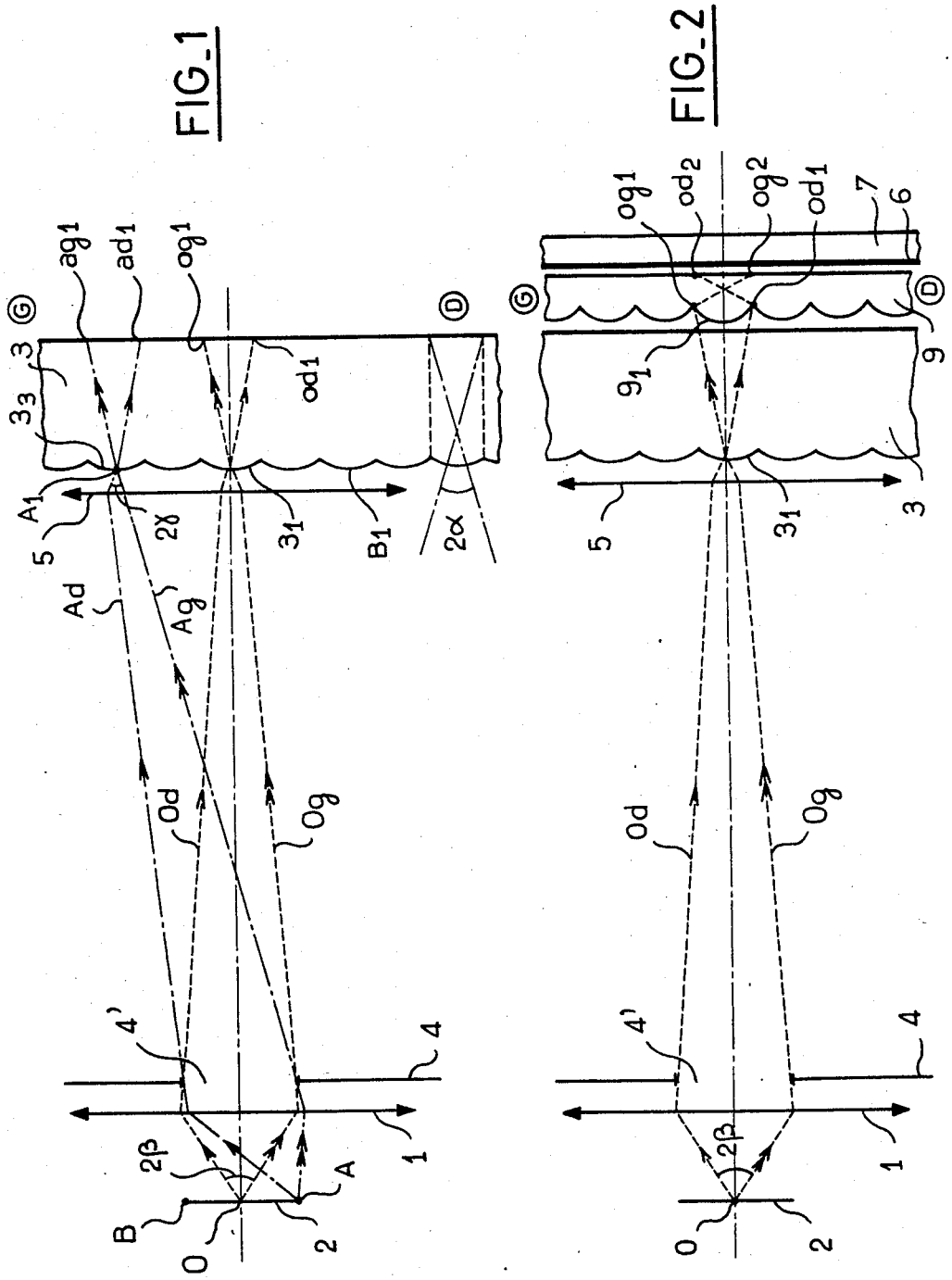

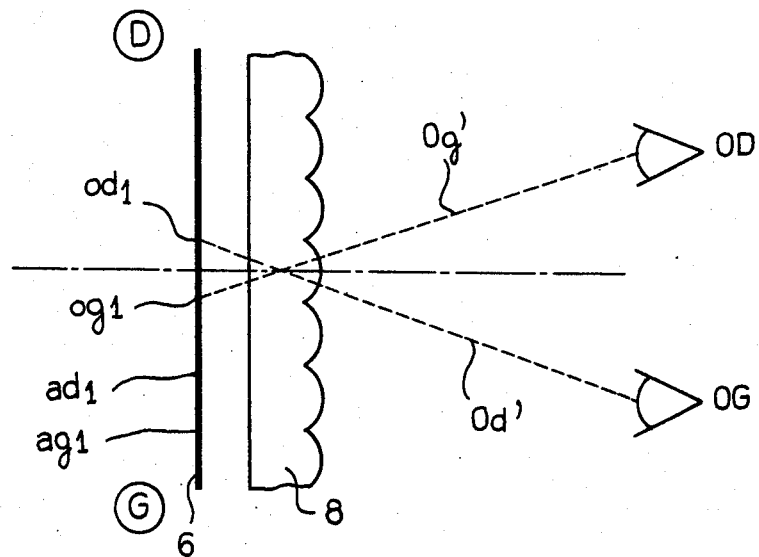
FIG._3
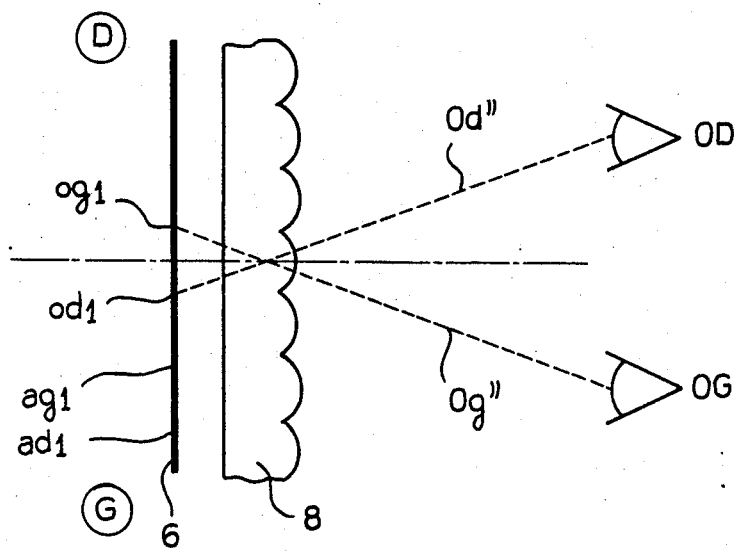
FIG._4

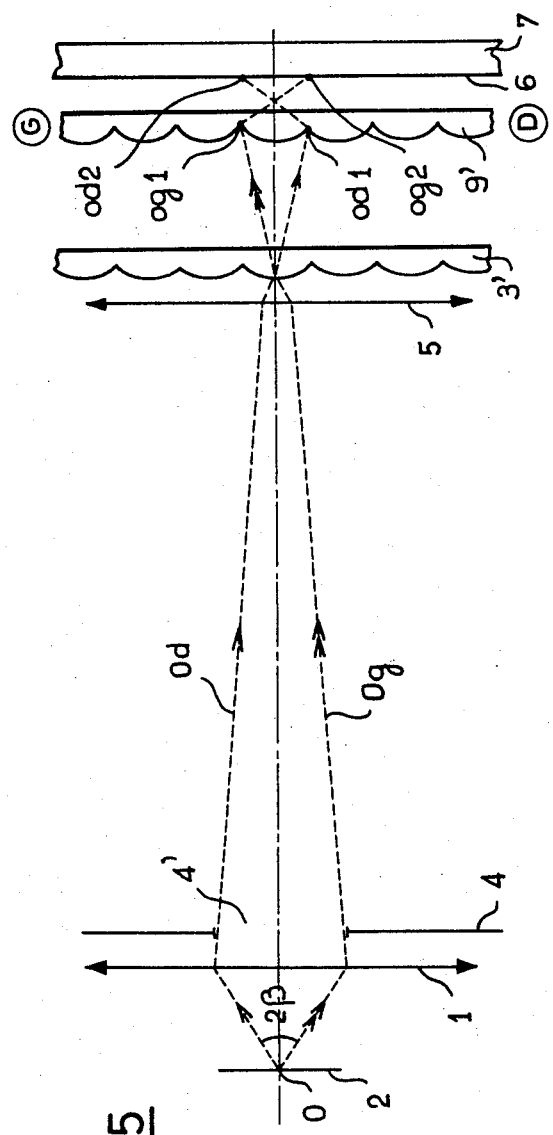
FIG_5
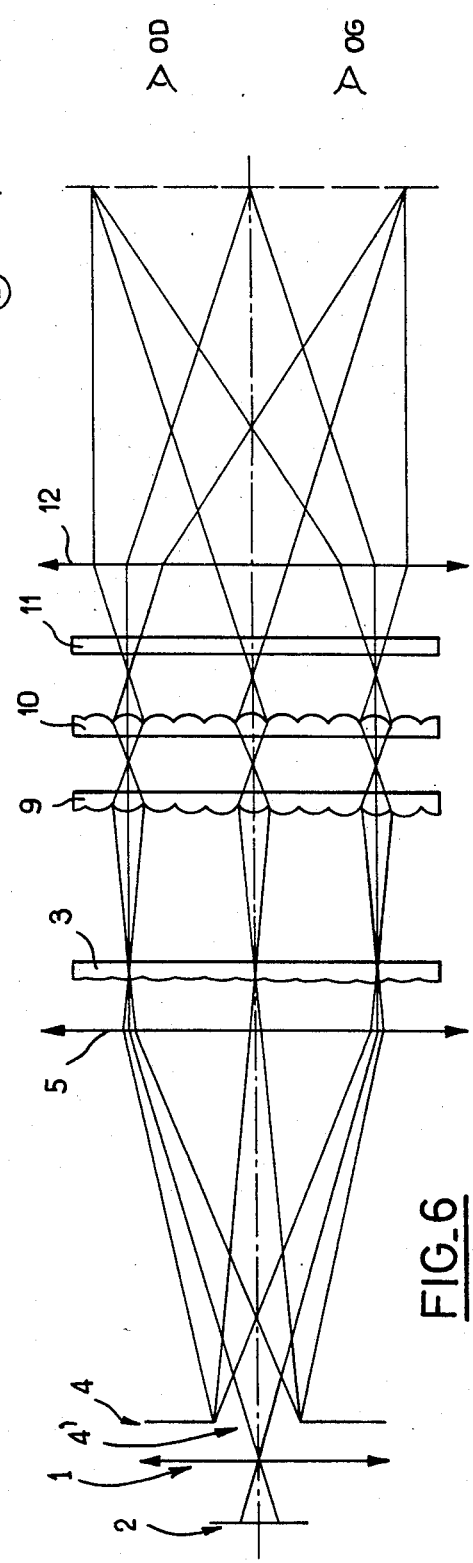
FIG_6

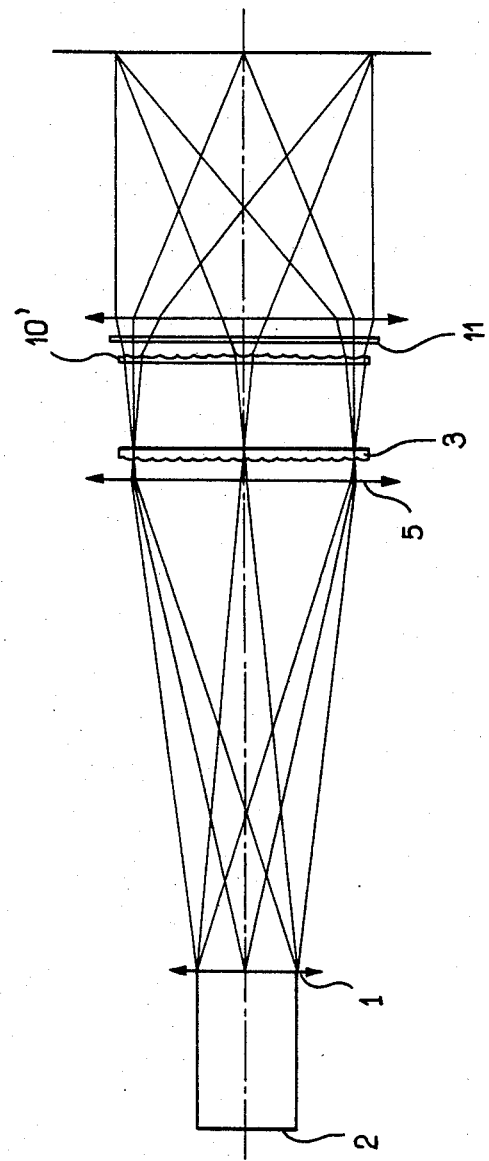
FIG_7

OPTICAL APPARATUS AND A METHOD OF RECORDING OR INSTANTANEOUSLY VISULIZING ENLARGED AND STEREOSCOPIC IMAGES OF OBJECTS

BACKGROUND OF THE INVENTION

1. Field of the Invention

This invention relates to a method of recording or instantaneously visualizing enlarged images which are "in relief" or stereoscopic images of objects, and to an optical apparatus implementing this method.

The expression "enlarged images of objects" is understood as designating images, the dimensions of which are of the same order of magnitude as or are greater than those of the object.

The expression "stereoscopic image" or image "in relief" is understood as designating an image which allows an observer thereof to have a different vision of the same object which is represented corresponding to different observation angles thereof, i.e. corresponding to a changing perspective of the object as a function of the position of the observer with respect to the image. In other words, during visualization, images of this type make it possible, on the one hand, to observe the object under changing aspects as a function of the observation angle and, on the other hand, even if the observer is immobile, to create an impression of relief due to binocular vision because, as the two eyes of the observer receive slightly different images of the same object, the brain is capable of reconstructing the spatial volume.

2. Description of the Prior Art

Different devices are already known which allow the production of such images which give an impression of relief during the restitution or the observation of the image. To this end, a lenticular grating is usually used which is formed from a series of thick elementary lenses which are spherical or preferably cylindrical and are juxtaposed. Thus, cylindrical lenticular gratings are usually in the form of a plate of transparent material, one face of which is grooved and the other is flat.

Lenticular gratings of this type which are formed from a series of juxtaposed, cylindrical, elementary lenses dissect or sample the images which impinge thereon into a series of extended elementary beams. Thus, the final resolution depends on the width of each lens.

An incident beam of parallel light impinging on the convex face of the lenticular grating is focussed at the level of the focal plane of the lenticular grating common to all the cylindrical lenses, a focal plane which generally corresponds to the flat face of the grating in the form of a family of very fine lines at a rate of one line behind each of said lenses. A second beam of parallel light, having an angle of incidence which is slightly different from the first beam, and consequently corresponding to a different observation angle of the object, is dissected and focussed into a second family of lines which are juxtaposed to the previous lines. Each family of lines which is formed in the focal plane of the lenticular grating corresponds to a particular direction of the incident light. The image thus formed in the focal plane of the lenticular grating is termed a "composite image".

Thus, the composite image is formed from a series of families of lines, the position of which depends on the direction of the incident beam.

Of course, the width of each line depends on the defects of the cylindrical lenses, such as aberrations, astigmatism, curvature of field, and diffraction.

In the prior art optical apparatus for the formation of images in relief, it has proved to be necessary to use a plurality of lenses or other optical devices (such as so-called Wollaston or Dove prisms) which use particularly complicates the optical devices and renders their production delicate, or it has proved necessary to perform a movement, either of the object, or of the apparatus, or of both simultaneously, in order to at least approximately cover each of the zones located at the level of the focal plane behind the different lenses of the lenticular grating. To this end, it is necessary for the relative movement to return to sweep over in the image space an angle substantially corresponding to the angle of field of the lenticular grating, i.e., the angle which determines an angular zone, inside which each direction of the incident beam of parallel light provides a specific family of image-lines at the level of the focal plane of the system. Any ray which departs from the angle of field of the lenticular grating will no longer be focussed on the part of the focal plane located just behind the penetrated cylindrical lens, but will be focussed on another part corresponding to an adjacent cylindrical lens. Thus, this angle of field should not be exceeded in order to avoid superpositions and interference of the information recorded in the form of lines.

Said movement between the object and the lenticular grating may comprise, for example a rotation of the exposure apparatus around the object, a translation of the lenticular grating, or a simultaneous rotation of the object and the lenticular grating.

French Pat. No. 943601 describes a device for the production of photographs in relief which may be used in particular for macrophotography and which uses this last type of movement. The device described in this patent comprises two platforms which are capable of rotation about an axis, and respectively support the object and the assembly of lenticular grating and photographic emulsion. The lens is stationary, and bellows ensure optical tightness between it and the lenticular grating. The two platforms are synchronous and rotate during the complete duration of the exposure determined by the shutter aperture, at an angle equal to the angle of field of the lenticular grating. Of course, the speed of rotation depends on the lighting conditions. The brighter the lighting, the faster the speed. Moreover, it is possible to change the magnification by varying the distance between the object and the lens, and the extension of the apparatus.

However, if apparatus of this type function correctly, they necessitate, due to the movement which is to sweep over the angle of field of the lens-shaped system, relatively long exposure times, thereby preventing the exposure of moving objects and dynamic phenomena.

Moreover, conventional apparatus usually provide, in a first stage, an inverted relief image. In order to correct this phenomenon of pseudo-stereoscopy, provision is made during visualization to either re-invert the relief of the composite image by means of a supplementary stage which comprises re-photographing the assembly of negative lenticular system with relief inversion, or inserting into the visualization device optical systems, such as lenticular gratings, which are to re-invert the relief during observation. These different solutions greatly complicate the optical device and are not completely satisfactory.

In particular, in conventional apparatus, the considerable spread of the beam necessitates the use of at least three lenticular gratings to obtain orthostereoscopy.

SUMMARY OF THE INVENTION

The present invention proposes a new method and a new optical apparatus allowing the recording or instantaneous visualization of enlarged images and images in relief of an object, with direct production of orthostereoscopy, i.e. restitution of the relief without deformation or anamorphosis. Thus, in a particular embodiment, an apparatus of this type makes it possible to directly observe an enlarged, three-dimensional object in correct relief.

The method allowing the instantaneous production of enlarged and stereoscopic images of objects according to the present invention comprises forming by means of a stationary stopped down lens, an enlarged image of an object in the vicinity of elementary lenses of a first lenticular grating having an angle of field substantially equal to the aperture angle of the exit pupil of the lens viewed from said first lenticular grating, in order to produce an instantaneous, composite, sampled image at the level of the focal plane of the first lenticular grating, the shape of the diaphragm being selected with respect to the lenticular grating so that the spread of the beams impinging on the elementary lenses is very small; forming an orthostereoscopic image by means of a second lenticular grating having an angle of field which differs from the first lenticular grating; and observing the orthostereoscopic composite image thus formed by means of a lenticular observation grating which has an angle of field substantially equal to the aperture angle of the entrance pupil of the lens viewed from the object.

According to one embodiment, the method also comprises an intermediate stage which consists of recording the composite enlarged image on a photographic film.

The optical apparatus according to the present invention for recording or visualizing relief images of objects comprises a stationary stopped down lens producing an enlarged image of an object, and a first lenticular grating, the elementary lenses of which are positioned in the vicinity of said enlarged image, the shape of the diaphragm being selected with respect to the lenticular grating such that the spread of the beams impinging on the elementary lenses is very small. According to a characteristic of the present invention, the angle of field of the first lenticular grating is substantially equal to the aperture angle of the exit pupil of the lens viewed from the lenticular grating in order to provide an instantaneous, composite, sampled image at the level of the focal plane of the lenticular grating. This instantaneous, composite, sampled image will be termed the first composite image.

According to another characteristic of the present invention, a field lens of the same format as the lenticular grating, or an element of a similar function is positioned upstream of the first lenticular grating towards the object.

The lens and the field lens advantageously form an afocal system.

According to another characteristic of the present invention, the optical apparatus comprises, downstream of the focal plane of the first lenticular grating, towards the image, a second lenticular grating which is different from the first from the point of view of angle of field and focal length, but preferably being of the same gauge as the first, the function of which is to invert the elementary images formed by each lens of the first lenticular grating, and to provide at substantially double the focal length of the second lenticular grating an orthostereoscopic, composite image which will be termed the second composite image.

According to another characteristic of the present invention, a photographic emulsion is provided at the level of this second composite image.

According to another characteristic of the present invention, a lenticular observation grating is also provided which has an angle of field substantially equal to the aperture angle of the entrance pupil of the lens viewed from the object, and is preferably of the same gauge as the first lenticular grating.

According to one embodiment, the lenticular observation grating is of a convex type and is positioned at the level of the plane of the second composite image.

According to another variant, the lenticular observation grating is of a concave type and is positioned in the vicinity of the first composite image.

According to a characteristic of the present invention, the above-mentioned lenticular grating are of a "cylindrical" type, and a lenticular grating is also provided which performs the task of expanding the beam, the cylindrical lenses of which grating are positioned perpendicularly to the cylindrical lenses of the first grating.

According to another characteristic of the present invention, the above-mentioned lenticular grating are of a spherical type.

According to another characteristic of the present invention, an image erecting device is positioned upstream of the lens, towards the object.

Other advantages and characteristics of the present invention will be revealed from reading the detailed description which follows, and with respect to the accompanying drawings which are provided by way of example.

BRIEF DESCRIPTION OF THE DRAWINGS

FIG. 1 schematically illustrates the various elements forming part of an optical apparatus for implementing a first stage of the method according to the present invention, FIG. 2 schematically illustrates an optical apparatus according to one production variant of the present invention, allowing an exposure, FIGS. 3 and 4 schematically illustrate a device for the observation of a photographic emulsion, showing the problems associated with relief inversion, FIG. 5 illustrates an optical apparatus similar to the embodiment of FIG. 2, FIG. 6 schematically illustrates an embodiment of an optical apparatus according to the present invention which is more particularly adapted to instantaneous visualization, and FIG. 7 schematically illustrates a variant of an optical apparatus according to the present invention which is more particularly adapted to instantaneous visulization.

DETAILED DESCRIPTION

The different embodiments which are illustrated in FIGS. 1 to 7 do not take into account the relative dimensions of the elements, or the distances and spacings between the elements.

The optical device which is illustrated in FIG. 1 comprises a stationary lens 1 which produces an enlarged image of width $A_1B_1$ of magnification g from an object 2 of width AB. In the vicinity of the plane of the enlarged image is positioned a stationary lenticular grating 3 which is preferably formed from a series of juxtaposed, convex, cylindrical lenses of a long focal length, thus of a small angle of field 2 α. A stationary diaphragm 4 of aperture 4' in the form of a fine slot of a substantially rectangular cross section is positioned next to the lens 1, the large dimension of the diaphragm being normal to the axis of the cylindrical lenses. The shape of the diaphragm is selected with respect to the lenticular grating so that the spread of the beams impinging on the elementary lenses is very small.

A field lens 5 covering the format of the image is inserted into the path of the light rays arriving at the lenticular grating 3. The purpose of this field lens is to render parallel the average directions of the beams of rays impinging on each cylindrical lens of the lenticular grating 3.

According to one embodiment, the field lens 5 may also be formed from a conventional Fresnel lens.

The aperture of the entrance pupil of the lens 1 is viewed from the object at a substantially constant angle 2 β, whatever the point of the object 2 which is being considered, whereas the angle under which the aperture of the exit pupil 4 of the lens is viewed from the image plane A1 B1 is equal to 2 γ.

Since the rays are slightly deflected while passing through the field lens 5, the angle 2 γ is determined by the angle which is made between two light rays initially emanating from the two opposite edges of the aperture of the exit pupil 4, such as the rays Ad and Ag illustrated in FIG. 1, when they arrive on the corresponding elementary lens, designated with reference numeral $3_3$ in the present case. It is clearly seen that the angle existing between the rays Ad and Ag, when they arrive on the cylindrical lens $3_3$, corresponds to the maximum angle made between the light rays passing through the aperture of the exit pupil of the lens.

According to a characteristic of the present invention, the lenticular grating 3 is provided with an angle of field 2 α which is substantially equal to the above-mentioned angle 2 γ.

Thus, it is understood that, without it being necessary to perform the least movement of the object 2 or of the various elements forming the optical apparatus, in particular movement of the lens 1, of the exit pupil 4 and of the lenticular grating 3, the light rays emanating from the object 2, passing through the lens 1, the aperture of the exit pupil 4 and the field lens 5, cover the quasi-entirety of the angle of field 2 α of the lenticular system 3.

The beams of rays which arrive on the elementary lenses, being parallel to each other, will consequently be focussed at the level of the focal plane of the lenses in the form of a series of fine lines, previously defined as forming a family of lines. The rays which are slightly displaced angularly with respect to the previously mentioned rays will likewise form a second family of lines juxtaposed to the previous lines, and so on in this manner until the quasi-entirety of the focal plane of the lenticular grating 3 is covered.

In order to avoid an overlap of the lines obtained by focussing rays using two adjacent lenses, it should be ensured that the previously defined angle 2 γ is at the most equal to the angle of field 2 α so that the rays emanating from the aperture of the exit pupil 4 cover at a maximum the angle of field 2 α of the lenticular grating 3, when said rays arrive on the elementary lenses of this system.

Thus, as illustrated in FIG. 1, the rays Od emanating from a trace of the object 2 normal to the plane of FIG. 1 and which contains the point designated with reference numeral 0, rays Od which correspond to a right-hand vision of the object according to an inclination angle β with respect to the normal to the plane thereof, are focussed by the cylindrical lens $3_1$ at the level of the focal plane of the lenticular grating 3, into a line normal to the plane of FIG. 1 and which contains the point od1.

Likewise, the rays Og emanating from the same trace of the object 2 which contains the point designated with reference numeral 0, but which correspond to a left-hand vision of this object according to an inclination angle α with respect to the normal to the plane of the object 2 are focussed by the same cylindrical lens $3_1$ at the level of the focal plane of the lenticular grating into a line normal to the plane of FIG. 1 and which contains the point og1.

All the rays emanating from the trace normal to the plane of FIG. 1 which contains the point 0, rays which thus correspond to a vision of the object included between the two previously mentioned observation angles, will thus be focussed by the cylindrical lens $3_1$ at the level of the focal plane of the lenticular grating 3 in the form of a series of lines normal to the plane of FIG. 1, and contained between the previously mentioned lines which respectively contain the points og1 and od1.

Similarly, all of the rays emanating from a trace of the object normal to the plane of FIG. 1 and which contain the point A located on the left-hand side of the object 2, rays which pass through the aperture of the exit pupil and, consequently, are included in the beam delimited by the rays Ad and Ag illustrated in FIG. 1, will focussed by the lens $3_3$ at the level of the focal plane of the lenticular grating 3 in the form of a series of lines normal to the plane of FIG. 1, included between the lines containing the points ag1 and ad1 which correspond respectively to the above-mentioned rays Ag and Ad.

Consequently, the lenticular grating 3 samples the enlarged image A1-B1 which is formed at the level of the elementary lenses, and each of these elementary lenses covers an area of the focal plane, the width of which depends on the width of the aperture of the exit pupil 4 of the lens. The characteristics of this lenticular system 3 (gauge, thickness, angle of field) should consequently be determined such that the width of the covered area of the focal plane (og1-od1, ag1-ad1) is substantially equal to, and in all cases, not greater than the gauge of the lenticular grating 3, in order to avoid the superpositioning of information.

The development provided above which refers to traces of the object and to lines of the focal plane of the lenticular grating relates to an optical apparatus which makes use of a cylindrical type of lenticular grating. Of course, the same reasoning may be applied to an optical apparatus which uses a lenticular grating formed from juxtaposed spherical lenses, by no longer considering traces of the object and lines of the focal plane of the lenticular grating which are parallel to the elementary lenses, thereof, but by considering points of the object and corresponding points of the focal plane of the lenticular grating. This reasoning may also be applied to a lenticular system comprising two gratings of cylindrical lenses, the axes of which are perpendicular to each other.

As is shown in FIG. 1, the composite image formed at the level of the focal plane of the lenticular grating 3 is inverted, as is the case in conventional photography, the top of the image corresponding to the bottom of the object, the left-hand side of the image corresponding to the right-hand side of the object, and vice versa. As is shown in FIG. 1, the point A of the object 2 which, for an observer positioned on the side of the lens with respect to the object, forms the left-hand side thereof is re-found on the right-hand side of the photographic emulsion 6 at ag1-ad1.

In addition to this first disadvantage which may be easily corrected by inverting the image (right-left, and top-bottom) using a suitable erecting device of the Wollaston or Dove prism type or a mirror device, positioned upstream of the lens, the image formed at the level of the focal plane of the lenticular grating 3 has the disadvantage of corresponding to a recording of the image in inverted relief.

In effect, it will be assumed that a photographic emulsion is positioned at the level of the focal plane of the lenticular grating 3. If, after development the photographic emulsion 6 is inverted right/left and top/bottom, the left-hand side (G) of the image should be located on the left-hand side of the observer and the right-hand side (D) of the image should be located on the right-hand side of the observer, as illustrated in FIG. 3. The series of lines "ag1-ad1" corresponding to the trace of the object containing the point A located on the left-hand side of the object is thus located on the left-hand side of the observer.

The point og1 which corresponds to a left-hand vision of the point 0 of the object 2 according to an inclination angle $\beta$ with respect to the normal to the plane of the object 2 is thus located on the left-hand side of the point od1 which corresponds to a right-hand vision of the point 0 of the object according to an inclination angle $\beta$ with respect to the normal to the plane of the object 2.

Thus, when after photographic treatment, the photographic emulsion 6 is illuminated and an observer observes said emulsion through a lenticular grating 8 of the same gauge as the lenticular grating 3 used for the recording, and positioned with the flat face against the support of the negative, the grooved face positioned towards the observer, the ray Og' corresponding to the point og1 which should be seen by the left eye (OG) arrives at the right eye (OD) and the ray Od' corresponding to the point od1 which should be seen by the right eye arrives at the left eye, as is clearly shown in FIG. 3. Thus, an inverted or pseudoscopic relief image is observed.

Of course, the lenticular observation grating must be of the same type as the lenticular grating 3 which is used for the recording. Thus, if the lenticular grating 3 is of a spherical type, the lenticular grating 8 will also be formed from a series of juxtaposed spherical lenses. Likewise, if the lenticular grating 3 is of a cylindrical type, the lenticular grating 8 will also be formed from a series of juxtaposed cylindrical lenses which are positioned parallel to the different lines formed on the negative.

In order to avoid such a disadvantage of inverted relief, it is possible to re-photograph the assembly of "negative+lenticular system" by inverting the relief, since an inversion of inverted relief restores the real relief.

Thus, as is shown in FIG. 4, if the positions of the points formed behind each lens are inverted, so that the points (og1, ag1) corresponding to left-hand visions of the object, are re-found on the right-hand side of the points (od1 and ad1) corresponding to right-hand visions of the object, the observer will acquire a correct vision thereof. The ray Og" which corresponds to the point og1 of a left-hand vision of the object according to an inclination angle $\beta$ with respect to the normal to the plane of the object 2 impinges on the left eye and, likewise, the ray Od" which corresponds to the point od1 of a right-hand vision of the object according to aninclination angle $\beta$ with respect to the normal to the plane of the object 2 impinges on the right eye of the observer.

As illustrated in FIGS. 3 and 4, the composite image is formed from a series of elementary images in a proportion of one elementary image behind each lens, each elementary image itself being formed from a series of juxtaposed lines corresponding to a vision of the same portion of objects according to different observation angles.

With respect to FIGS. 3 and 4, it appears to be necessary, when said composite image is observed through a simple, convex lenticular grating , for the left-right direction (og1, od1) of the elementary images to be inverted with respect to the left-right direction (GD) of the image of the object.

In other words, the elementary image recorded behind each cylindrical lens corresponds to the image of the exit pupil of the lens (or to the image of the geometric position described by this pupil with respect to the lenticular grating, in the case of a displacement) and, consequently, it is essential for the image of this pupil to be inverted with respect to the left-right direction of the image of the object.

Of course, the relief correction may be obtained using any suitable conventional devices which make use of adequate lenticular gratings, such as those described in French Patent Application No. 2,196,486.

In order to overcome the above-mentioned disadvantage, according to one embodiment of the optical apparatus according to the present invention and as illustrated in FIG. 2, a second lenticular grating 9 of the same gauge as the first lenticular grating 3 but preferably having a much shorter focal length than the previous lenticular grating 3 is introduced behind this grating 3. The lenticular grating 9 is preferably positioned inside the optical apparatus such that its grooved face is turned towards the flat face of the lenticular grating 3, the cylindrical lenses of the lenticular grating 9, when a cylindrical type of lenticular grating 3 is used, being positioned parallel to the cylindrical lenses of the lenticular grating 3.

As is shown in FIG. 2, each cylindrical lens ($9_1$) of the lenticular grating 9 retakes the images ($og_1$-$od_1$) formed at the level of the focal plane of the corresponding lens ($3_1$) of the first lenticular grating 3 and provides a new inverted image thereof (od2-og2) in a magnification of $-1$, substantially at double its focal length. Thus, the lenticular grating 9 is particular insofar as its flat face does not correspond to its focal plane, but to a plane which is substantially located at double the length of its focal plane with respect to its grooved face.

In a conventional manner in order to obtain a magnification of $-1$ (an image of the same size but inverted with respect to the object), the second lenticular grating 9 is arranged inside the apparatus such that "the object" (elementary image of the first composite image, i.e., the image of the exit pupil) and "the image" (elementary image of the second image or orthostereoscopic image) are located at the level of the antiprincipal planes of the elementary lenses of the second lenticular grating 9. If an "image" (elementary image of the orthostereoscopic image) which is slightly enlarged with respect to "the object" and is still inverted is desired, the distance from the top of the diopter to "the object" has to be slightly reduced and the distance from the top of the diopter to "the image" has to be increased.

According to the embodiment of the optical apparatus illustrated in FIG. 2, a photographic emulsion 6 carried by a support 7 is positioned at the level of the second composite image (orthostereoscopic composite image) which is formed at double the focal length of the lenticular grating 9.

After photographic treatment, it is sufficient to illuminate the photographic emulsion and observe said emulsion through a lenticular observation grating of the same gauge as the first lenticular grating which is used for the recording and is positioned similarly to the previously described lenticular grating 8 with respect to FIG. 4, in order to observe a correct relief image of the object 2.

The angle of field of this lenticular observation grating should preferably be equal to the aperture angle of the entrance pupil of the lens viewed from the object 2.

That is to say that, on the one hand, an immobile observer will have an impression of relief, his two eyes receiving slightly different images corresponding to slightly different observation angles of the same object, with the brain reconstructing the spatial volume on this basis. On the other hand, an observer who is mobile with respect to the emulsion and the lenticular observation grating will have the impression of "turning" around the object, since he will be observing the object at angles which differ depending on his position.

Of course, as is taught, in particular in French Pat. No. 2,097,205, it is also possible to use any conventional means which allow the projection of the image on a lenticular visualization grating, the emulsion 6 no longer being in contact with the lenticular observation grating 8.

In fact, it has proved to be preferable to provide the first lenticular grating 3 with an angle of field 2 $\alpha$ which is slightly greater than the angle 2 $\gamma$, under which the aperture of the exit pupil is viewed from the image plane, so that on the one hand, all of the focal plane of the lenticular grating 3 is not completely covered in order to avoid the overlapping of information at this level, on the other hand, to avoid information interference which could be caused by the second lenticular grating 9, if this system is slightly displaced with respect to the first system, or could be due to production defects thereof if, for example, its flat face is located at a slightly greater distance than double its focal length, thus causing an absolute magnification slightly greater than one.

Thus, it is understood that it is easier to act on the angle of field of the second grating and on the focal length thereof in order to obtain, at the level of its flat face, a composite image which covers all of the format of the image, without an overlap.

According to the different embodiments of the optical apparatus which have just been described, this apparatus uses so-called "dioptric" lenticular systems, i.e., systems in which the different composite images are formed at the level of the flat face of the system. If the use of such systems proves to be preferable, none the less, as is shown in FIG. 5, optical apparatus according to the present invention may be perfectly produced using lenticular systems which do not have this characteristic, i.e., lenticular systems for which the flat face no longer corresponds to the plane of the composite image (the lenticular system is then of the type termed "thin lenses").

Thus, FIG. 5 which illustrates an optical apparatus similar to the optical apparatus illustrated in FIG. 2 also shows the lens 1 and its exit pupil 4 which provides an enlarged image of the object 2 at the level of the grooved face of the lenticular grating 3' formed by a device of the above-mentioned "thin lens" type, in front of which is positioned a field lens 5 in order to form a composite image of the object 2 at the level of the focal plane of the lenticular grating 3'.

According to the present invention, the lenticular grating 3' has an angle of field 2 $\alpha$ which is substantially equal to the above-mentioned angle 2 $\gamma$ which corresponds to the angle under which the aperture 4' of the exit pupil 4 of the lens 1 is viewed from the image plane. Thus, the light rays emanating from the object 2, penetrating the lens 1, the aperture of its exit pupil 4 and the field lens 5, cover the quasi-entirety of the angle of field 2 $\alpha$ of the lenticular grating 3'.

Moreover, as is illustrated in FIG. 5, a lenticular grating 9' of the above-mentioned "thin lens" type is introduced between the lenticular grating 3' and a photographic emulsion 6, similarly to the optical apparatus illustrated in FIG. 2. The function of this lenticular grating. 9', as of the lenticular grating 9 of FIG. 2, is to retake the images formed behind each of the lenses of the first lenticular grating 3' at the level of the focal plane thereof, and to provide a new inverted image thereof in a magnification of $-1$, at double its focal length in order to form a composite image in correct relief (so-called second composite image).

According to another embodiment which is not illustrated in the figures, the optical apparatus may comprise, upstream of the lens, towards the object a standard device comprising a mirror or a prism, such as a so-called Wollaston or Dove prism, in order to reverse the image, left/right, and top/bottom. However, it should be noted that an inversion of this type is not really complicated within the scope of the exposure, the inversion of the image being easily effected when the emulsion, having undergone a photographic treatment, is positioned with a view to observation. On the other hand, the use of erecting devices will be very advantageous in the case of direct visual observations, as will be shown in the following description.

Another embodiment of the optical apparatus of the present invention will now be described. This apparatus is illustrated in FIG. 6 and it allows direct observation. In a similar manner to the optical apparatus illustrated in FIGS. 2 and 4, FIG. 6 shows the lens 1 and its diaphragm 4 which provides an enlarged image of the object 2 at the level of the grooved face of the lenticular grating. 3, upstream of which a field lens 5 is positioned in order to form, at the level of the focal plane of this lenticular system 3, the first composite image corresponding to an inverted relief image. A lenticular grating 9 of the same gauge as the lenticular grating 3 retakes the images (ogl-odl) formed at the level of the focal plane of the corresponding lens of the first lenticular grating, and provides a new inverted image thereof (od2-og2) in a magnification of −1 at double its focal length (so-called second composite image).

Therefore, the second composite image thus formed corresponds to the previously defined characteristic which is necessary for the production of a correct vision in relief, that is that the left-right direction of the elementary images is reversed with respect to the left-right direction of the image of the object.

Whereas in the case of the optical apparatus illustrated in FIG. 2, a photographic emulsion 6 was positioned at the level of the second composite image, in this case, the focal plane of a lenticular observation grating 10 is positioned at the level of this second composite image, this grating 10 being similar to the lenticular observation grating described with respect to FIGS. 3 and 4 and being positioned such that its flat face is oriented towards the lens.

Thus, the lenticular observation grating 10 should have the same gauge as the previous lenticular gratings 3 and 9, but it will advantageously have a much smaller thickness.

As will be revealed in the following description, the lenticular observation grating 10 will advantageously have an angle of field equal to the angle 2 β which corresponds to the angle under which the aperture of the entrance pupil is viewed from the object 2.

If the lenticular observation grating 10 is formed from a series of juxtaposed, convex, cylindrical lenses, the optical apparatus also comprises, as illustrated in FIG. 6, a fourth lenticular grating 11, formed from a series of juxtaposed, cylindrical lenses, which system performs the operation of expanding the beam. To this end, the longitudinal axis of the cylindrical lenses of the lenticular grating 11 is positioned perpendicularly to the longitudinal axis of the elementary lenses of the previously mentioned lenticular grating 3, 9 and 10.

In fact, if an observer attempts to examine said second inverted composite image through the lenticular observation grating 10 without using the lenticular grating which expands the beam, he will only be able to observe one horizontal line formed by the rays located within the plane of his eyes. Therefore, in order to observe an adjacent horizontal line, the observer will have to move himself vertically.

On the other hand, this disadvantage is overcome by using the beam expander lenticular grating 11 which is mentioned above. The use thereof is based on the following finding: if a pinpoint light source or a light source of a small angular range is observed by the naked eye through the lenticular system, the apparent dimension of the source increases in the direction perpendicular to the axis of the cylindrical lenses, but it remains practically constant in the direction parallel to this axis. Consequently, since the axis of the cylindrical lenses of the lenticular grating is positioned horizontally with respect to the normal position of the observer's eyes, as illustrated in FIG. 6, the lenticular grating 11, expanding the beam, does not modify the width of the object at all (in a direction parallel to the axis of the cylindrical lenses), but brings the rays down towards the eyes so that the observer sees all of the image of the object.

Moreover, the optical apparatus comprises, downstream of the lenticular grating 11, towards the image an ocular 12, the function of which is to return the image to an observation distance which is suitable for the eye.

Another method of overcoming the above-mentioned disadvantage comprises introducing into an apparatus provided for direct observation, a "focussing screen" positioned at the level of the second composite image between the second lenticular grating 9 and the lenticular grating observation grating 10. This variant certainly proves to be less luminous, but provides the advantage of affording an observation area for a number of observers.

Another production variant of the present invention will now be described. It is illustrated in FIG. 7.

This figure also shows the stopped down lens 1 which provides an enlarged image of the object 2 at the level of the grooved face of the lenticular grating 3, upstream of which a field lens 5 is positioned in order to form, at the level of the focal plane of this lenticular grating 3, the composite image corresponding to an inverted relief image. However, according to the embodiment of FIG. 7, the correct relief is not obtained using convex lenticular gratings, as has previously been described, but using a concave lenticular grating 10' which also acts as a lenticular observation grating. The grooved face of the lenticular grating 10' is positioned in the vicinity of the focal plane of the first lenticular grating 3. Moreover, in so far as the lenticular grating 10' is of a cylindrical type, the optical device illustrated in FIG. 7 must also comprise a beam expander system 11, as previously described. Finally, an ocular 12 is provided downstream of the lenticular grating 11, towards the image.

Of course, when lenticular gratings (3, 9, 10) are used which themselves comprise two lenticular gratings formed from perpendicularly positioned, cylindrical lenses, or when a spherical system is used in order to record and restore the relief, no longer in one direction, but in two directions, the beam expander lenticular grating 11 is redundant.

A generalization of this type applies notably to the case of considerable magnification, such as the case of microscopy (g greater than 20). In fact, in this case, the physical phenomenon of diffraction becomes preponderant and it proves to be essential to use two crossed lens-shaped systems of a cylindrical type, or one spherical type of lenticular grating in order to avoid the problems of diffraction by producing a second selection, as it were. In this case, the entrance pupil of the lens will adopt a square or circular cross-section of small dimensions. This arrangement allows, on the one hand, the production of an "integral relief" in all directions, and on the other hand, allows an improved depth of field to be obtained.

According to one production variant, the field lens 5 may be omitted. It is then necessary (the periodicity of the first composite image differing from that of the first lenticular grating) to use an inverter lenticular grating 9, the gauge of which is greater than that of the first lenticular grating 3. The lenticular observation grating 10 must also be of a gauge different from and greater than those of the above-mentioned lenticular grating 3 and 9. The increase in these gauges is calculated according to simple laws of geometry.

According to one production variant for direct visual observation, the inverter lenticular grating 9 and the lenticular observation grating 10, both being of a convergent type, may be replaced by a single lenticular grating 10' of a concave or divergent type. In this variant, if the field lens 5 is omitted, the gauge of the lenticular grating 10' will have to be greater than that of the first lens-shaped system 3. Here again, the increase in this gauge is calculated according to simple laws of geometry.

The optical apparatus which has been described with respect to FIG. 7 has the disadvantage of providing an inverted image with respect to the object, i.e. an inversion from left to right and from top to bottom. Of course, such a disadvantage may, however, be easily overcome by positioning upstream of the lens, towards the object, an image erecting device, of the mirror or prism type, such as a prism of the Wollaston or Dove type.

The optical apparatus of the present invention has, moreover, the advantage of easily allowing a relief modification of the observed object, i.e. said apparatus allows the production of either a reduced relief (hypostereoscopy), or an exaggerated relief (hyperstereoscopy.

In fact, if the angle of field of the lenticular observation grating (10, 10') is equal to the angle $2\beta$ under which the aperture of the entrance pupil is viewed from the object 2, the observer, during observation, will have the impression of turning around the object at an angle equal to the aperture angle $2\beta$ of exposure. Consequently, the relief will be correct (a cube is a cube). Now, if the aperture angle of exposure or the angle $2\beta$, under which the aperture of the entrance pupil of the object is viewed, is smaller than the angle of field of the lenticular observation grating (10, 10'), the observed relief will be reduced, since it corresponds to a smaller recording angle. However, during observation, the observer will still "turn" around the object by an angle corresponding to the angle of field of the lenticular grating. Thus, if the observer is positioned in order to observe a limiting ray of the angle of field of the lenticular observation grating, he will observe an imaginary ray emanating from the object 2 according to a lower observation angle, hence the impression of reduced relief, and an impression of hypostereoscopy.

Likewise, if the aperture angle of exposure or the angle $2\beta$, at which the aperture of the entrance pupil of the object is viewed, is greater than the angle of field of the lenticular observation grating, the recorded relief will be enlarged, since it corresponds to a higher angle of rotation. However, during observation, the observer will still "turn" around the object by an angle corresponding to the angle of field of the lenticular grating. Thus, if the observer is positioned in order to observe a limiting ray of the angle of field of the lenticular observation grating, he will really be observing a ray corresponding to a vision of the object according to a greater angle, hence the impression of exaggerated relief, and of hyperstereoscopy.

Of course, the reverse effect is obtained by modifying the angle of field of the lenticular observation grating.

By reducing this angle of field of the lenticular observation grating, without modifying the exposure angle, a hyperstereoscopy will be obtained.

By increasing this angle of field of the lenticular observation grating, without modifying the exposure angle, a hypostereoscopy will be obtained.

In all the embodiments of the optical apparatus according to the present invention, the lenticular systems may be formed either from so-called "dioptric" systems, or from "thin lens" type systems.

Of course, the ratio of magnification of the apparatus may be easily modified by modifying the focal length of the lens.

On the other hand, it is known that in conventional optical systems, if the transverse linear magnification is defined by g, the axial magnification will be $g^2$. To a certain extent, the different lenticular gratings which are used within the frame of the present invention advantageously allow the modification of the axial magnification without affecting the transverse magnification, in order to restore a substantially correct relief.

However, according to an advantageous characteristic of the present invention, the lens 1 and the field lens 5 are positioned inside the optical apparatus in order to form an afocal system, i.e., the optical interval which exists between the image focus of the lens and the object focus of the field lens is zero. In such a case, the transverse linear magnification is constant and thus, it is the same for the axial magnification. Thus, the lenticular gratings which follow this afocal system may be arranged in order to correct the axial magnification of the apparatus (to equate the axial magnification of the apparatus with the transverse magnification), whatever the observation area. The image of an object in the form of a cube corresponds to a perfect cube with an arrangement of this type.

Of course, the present invention is not restricted to the embodiments which have been described, from which other forms and other embodiments may be provided, without departing from the scope of the present invention. For example, the field lens may easily be replaced by a spherical mirror.

What we claim is:

1. A method allowing the instantaneous production of enlarged and sterosropic images of objects, which method comprises:
    (a) forming by means of a stationary stopped down lens (1,4) an enlarged image of an object (2) in the vicinity of elementary lenses of a first lenticular grating (3) having an angle of field ($2\alpha$) substantially equal to the angle ($2\gamma$) of aperture of the exit pupil of the lens viewed from said first lenticular grating (3), in order to produce an instantaneous, composite, sampled image at the level of the focal plane of the first lenticular graitng,
    (b) forming an orthosteroscopic image by means of a second lenticular grating (9, 10') which differs from the first,
    (c) observing the orthostereoscopic composite image thus formed by means of a lenticular observation grating (10, 10') which has an angle of field substantially equal to the angle of aperture ($2\beta$) of the entrance pupil of the lens (1) viewed from the object (2).

2. A method according to claim 1, which method also comprises an intermediate state which records the composite enlarged image on a photographic film.

3. A method according to claim 1, wherein the lenticular gratings (3, 9) are cylindrical and the diaphragm is a fine slot.

4. A method according to claim 1, wherein the lenticular grating (3, 9) are of a spherical type and the diaphragm is of a substantially rectangular shape.

5. An optical apparatus for the instantaneous production of enlarged and steroscopic images of objects, comprising a stationary stopped down lens (1, 4) providing an enlarged image of an object (2), a first lenticular grating (3), the elementary lenses of which are positioned in the vicinity of said enlarged image, and the angle of field ($2\alpha$) of said first lenticular grating is substantially equal to the angle of aperture ($2\gamma$) of the exit pupil (4) of the lens viewed from the lenticular grating (3).

6. An optical apparatus according to claim 5, wherein the first lenticular grating (3) is formed from a series of juxtaposed, convex, cylindrical lenses.

7. An optical apparatus according to claim 5, wherein the first lenticular grating (3) is formed from juxtaposed, spherical, convex lenses.

8. An optical apparatus according to claim 5, wherein the device forming said first lenticular grating (3) comprises two adjacent elementary lenticular gratings each consisting of series of juxtaposed, convex, cylindrical lenses, the two elementary lenticular gratings being positioned side by side such that their respective lenses are oriented perpendicularly.

9. An optical apparatus according to claim 5, further comprising, downstream of the focal plane of the first lenticular grating (3), towards the image, a second lenticular grating (9) which differs from the first, for inverting the elementary images formed by each lens of the first lenticular grating, and for providing an orthosteroscopic composite image at substantially double the focal length of the second lenticular grating.

10. An optical apparatus according to claim 9, wherein the second lenticular grating (9) is of the same type, cylindrical or spherical, as the first lenticular grating (3), and is positioned inside the optical apparatus such that the elementary lenses of the second lenticular grating receive the elementary images formed by the first lenticular grating.

11. An optical apparatus according to claim 9, wherein a photographic emulsion (6) is provided at the level of the orthostereoscopic composite image.

12. An optical appatatus according to claim 9, wherein a lenticular observation grating (10) is also provided which has an angle of field substantially equal to the angle of aperture ($2\beta$) of the entrance pupil of the lens (1) viewed from the object (2).

13. An optical appratus according to claim 12, wherein the lenticular observation grating (10) is positioned such that its focal plane merges with the orthostereoscopic composite image.

14. An optical apparatus according to claim 12, wherein the lenticular observation grating (10) is formed from juxtaposed, convex, cylindrical lenses, positioned parallel to the cylindrical lenses of of the two first systems (3, 9).

15. An optical apparatus according to claim 5 wherein a lenticular observation grating (10') is also provided which has an angle of field substantially equal to the angle of aperture ($2\beta$) of the entrance pupil of the lens (1) viewed from the object (2), said lenticular observation grating (10') being formed from juxtaposed, concave lenses positioned opposite the lenses of the first grating (3), and said lenticular observation grating (10') being positioned downstream of the focal plane of the first lenticular grating, towards the image.

16. An optical apparatus according to claim 15, wherein the lenticular observation grating (10') is of a cylindrical type.

17. An optical apparatus according to claim 12, wherein a focussing screen is also provided at the level of the orthostereoscopic composite image.

18. An optical apparatus according to claim 15, wherein the lenticular observation grading (10) is formed from juxtaposed, spherical lenses.

19. An optical apparatus according to claim 15, wherein the lenticular observation grating (10) is formed from two adjacent, elementary lenticular gratings, each comprising a series of juxtaposed, cylihdrical lenses, the two elementary lenticular gratings being positioned side by side such that their respective lenses are oriented perpendicularly.

20. An optical apparatus according to claim 12 wherein a lenticular grating (11) is provided which acts as a beam expander, the cylindrical lenses of which are positioned perpendicularly to the cylindrical lenses of the first grating (3).

21. An optical apparatus according to claim 5, wherein a field lens (5) of the same format as the first lenticular grating (3) is positioned upstream thereof, towards the object, and all the lenticular gratings (3, 9, 10, 10') have an identical gauge.

22. An optical apparatus according to claim 21, wherein the lens (1) and the field lens (5) form an afocal system.

23. An optical apparatus according to claim 12, wherein an ocular (12) is positioned downstream of the last lenticular grating, towards the image.

24. An optical apparatus according to claim 5, wherein an erecting device is positioned upstream of the lens (1) towards the object, in order to re-erect the image.

25. An optical apparatus according to claim 24, wherein the erecting device is of the type of a Wollaston or Dove prism.

26. An optical apparatus according to claim 24, wherein the erecting device is a mirror device.

* * * * *

UNITED STATES PATENT AND TRADEMARK OFFICE
CERTIFICATE OF CORRECTION

PATENT NO. : 4,621,897
DATED : November 11, 1986
INVENTOR(S) : Maurice Bonnet

It is certified that error appears in the above-identified patent and that said Letters Patent is hereby corrected as shown below:

On the Title Page: Item [73]
In the identification of the Assignee,
"(CNRA)" should be --(CNRS)--.

Signed and Sealed this

Twenty-fourth Day of March, 1987

Attest:

DONALD J. QUIGG

Attesting Officer     Commissioner of Patents and Trademarks